(12) United States Patent
Ebert et al.

(10) Patent No.: US 9,640,833 B2
(45) Date of Patent: May 2, 2017

(54) LITHIUM SECONDARY CELL ARRAY

(76) Inventors: Klaus Ebert, Berlin (DE); Stefan Meyer, Berlin (DE)

( * ) Notice: Subject to any disclaimer, the term of this patent is extended or adjusted under 35 U.S.C. 154(b) by 170 days.

(21) Appl. No.: 14/115,715

(22) PCT Filed: Apr. 24, 2012

(86) PCT No.: PCT/EP2012/057423
§ 371 (c)(1),
(2), (4) Date: Mar. 31, 2014

(87) PCT Pub. No.: WO2012/152570
PCT Pub. Date: Nov. 15, 2012

(65) Prior Publication Data
US 2014/0220399 A1 Aug. 7, 2014

(30) Foreign Application Priority Data

May 6, 2011 (DE) .................. 10 2011 100 730
Jun. 20, 2011 (DE) .................. 10 2011 105 040

(51) Int. Cl.
*H01M 10/052* (2010.01)
*H01M 2/26* (2006.01)
(Continued)

(52) U.S. Cl.
CPC ......... *H01M 10/052* (2013.01); *H01M 2/263* (2013.01); *H01M 2/361* (2013.01);
(Continued)

(58) Field of Classification Search
None
See application file for complete search history.

(56) References Cited

U.S. PATENT DOCUMENTS 5,491,037 A 2/1996 Kawakami .................. 429/49
5,674,641 A * 10/1997 Cheu ........................ 429/306
(Continued)

FOREIGN PATENT DOCUMENTS

DE 694 20 438 4/2000 ............ H01M 6/52
DE 699 00 105 11/2001 ............ H01M 10/04
(Continued)

OTHER PUBLICATIONS

Notification Concerning Transmittal of International Preliminary Report on Patentability (Chapter I of the Patent Cooperation Treaty), in English, dated Nov. 21, 2013, International Preliminary Report on Patentability (Chapter I of the Patent Cooperation Treaty), in English, dated Nov. 12, 2013, Written Opinion of the International Searching Authority, in English (Nov. 12, 2013— mailed with Notification Concerning Transmittal of the International Preliminary Report on Patentability), and International Search Report, in English, dated Aug. 13, 2012, each of which was issued by the International Bureau of WIPO for corresponding PCT Application No. PCT/EP2012/057423, filed on Apr. 24, 2012.

*Primary Examiner* — Miriam Stagg
*Assistant Examiner* — Harron S Sheikh
(74) *Attorney, Agent, or Firm* — Bodner & O'Rourke, LLP; Gerald T. Bodner; Christian P. Bodner (57) ABSTRACT

A lithium secondary cell array in a cylindrical design has a winding mandrel and a winding packet, which contains foil-like coated strips and contacting strips that form the electric cell structure consisting of anode, cathode and separator. The cell array has outer electrical connections which include pole caps. The winding mandrel includes an insulating material and has a through-channel extending in the longitudinal axis direction. The winding mandrel is connected to an inner pole cap at each end, the pole caps likewise having a respective through-channel. One outer pole cap having a through-passage is respectively provided, (Continued)

which surrounds the winding packet circumferentially at least in the edge region, wherein several radially arranged force-fit connections, each acting between the outer and the inner pole cap, are used to fix the winding packet and achieve the electrical contacting between the contacting strips and the outer pole cap.

10 Claims, 7 Drawing Sheets

(51) Int. Cl.
    *H01M 2/36*         (2006.01)
    *H01M 10/0587*    (2010.01)
    *H01M 10/654*     (2014.01)
    *H01M 10/6567*    (2014.01)
    *H01M 10/643*     (2014.01)
    *H01M 10/613*     (2014.01)

(52) U.S. Cl.
    CPC ....... *H01M 2/362* (2013.01); *H01M 10/0587* (2013.01); *H01M 10/613* (2015.04); *H01M 10/643* (2015.04); *H01M 10/654* (2015.04); *H01M 10/6567* (2015.04)

(56) References Cited

U.S. PATENT DOCUMENTS

| | | | |
|---|---|---|---|
| 5,849,431 A | 12/1998 | Kita et al. | 429/164 |
| 5,882,811 A | 3/1999 | Kawakami | 429/49 |
| 6,572,998 B2 | 6/2003 | Kageyama | 429/56 |
| 6,869,723 B2 | 3/2005 | Yamaguchi | 429/94 |

FOREIGN PATENT DOCUMENTS

| | | | | |
|---|---|---|---|---|
| DE | 699 13 570 | 9/2004 | ............. | H01M 2/30 |
| DE | 698 29 544 | 3/2006 | ............. | H01M 2/02 |
| DE | 696 36 796 | 10/2007 | ............. | H01M 2/26 |
| DE | 10 2007 032 520 | 1/2009 | ............ | H01M 10/40 |
| DE | 10 2007 000 428 | 2/2009 | ............ | H01M 10/40 |
| WO | WO 2004/075320 | 9/2004 | ............ | H01M 4/70 |
| WO | WO 2009/048303 | 4/2009 | ............ | H01M 10/04 |

* cited by examiner

LITHIUM SECONDARY CELL ARRAY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION (1) Field of the Invention

The invention relates to a lithium secondary cell array of a cylindrical design with a winding mandrel and a winding package, which contains foil-like, coated strips and contacting strips that form the electric cell structure consisting of the anode, cathode and separator, and having external electrical connecting means, these comprising pole caps in accordance with claim 1.

(2) Description of Related Art

DE 696 36 796 T2 discloses a cylindrical secondary battery comprising pole caps already known, whereby the contact is established such that the respective foil of the winding is guided to the outside like a strip. In this case, either a plurality of such strips has to be handled, which can lead to mechanical problems such as compression or material breaks, or there is a limitation to a few strips which are led out from the foil winding, but which reduces the current carrying capacity.

DE 699 00 105 T2 already discloses a secondary battery with non-aqueous electrolytes in the form of a winding arrangement. There, an elongated positive and negative electrode with a separator is laminated in such a manner that the positive electrode forms an outer layer.

In DE 699 13 570 T2, the lithium secondary cell shown there is designed as a rolled cylinder. Furthermore there are connector assemblies which are contacted by a plurality of electrode contact pins, so that the electric power generated by the accommodated electrode unit can be supplied to an external device. In addition, a cover is provided for the entire assembly with a gas vent plug. However, the electrode contact pins used for contacting, which ensure the desired contacting at certain intervals within the winding, only allow the use of a small part of the material cross-section for the actual current transport. This means that the power is limited during both charging and discharging of a corresponding lithium secondary cell.

The generic DE 10 2007 000 428 A1 assumes a winding mandrel of a lithium ion cell. There is a trilaminate of anode, cathode and separator on the winding mandrel. Furthermore, there are so-called pole plugs, whereby the trilaminate is wound around the winding mandrel to produce the desired winding and whereby the pole caps are inserted into the ends of the winding mandrel. The diameter of the head of the pole caps in accordance with DE 10 2007 000 428 A1 is smaller than the diameter of the winding. In one embodiment a washer is fitted before fastening the pole cap to the winding mandrel and this is then located between the winding and pole cap. This washer has a diameter which can be up to the maximum diameter of the winding and is made of a material of the corresponding poles, e.g. copper for the anode side or aluminium for the cathode side. In a further embodiment the washer can be realised as a star, cross or spoke. This should enable a shakeproof fixation of the pole contact. The contacting of the washer with the foil winding is effected through welding, which is a very complicated technological step.

With respect to the prior art in terms of secondary batteries with non-aqueous electrolytes, reference is made to DE 698 29 544 T2, and with respect to a method to recover materials from lithium cells to DE 694 20 438 T2.

Cooling ventilation is provided in the stackable energy store based on lithium polymer cells in accordance with DE 10 2007 032 520 A1. The cooling air is passed through the device by a tube-like winding mandrel. Pole caps in this are designed as threaded tubes that are screwed into the lower and upper part of the winding mandrel. The pole caps perform the cooling ventilation.

BRIEF SUMMARY OF THE INVENTION

From the foregoing, the object of the invention is to provide a more sophisticated lithium secondary cell array of a cylindrical design which has a winding mandrel and a winding package, the latter comprising foil-like coated strips and contacting strips that form the electrical cell structure of anode, cathode and separator. The lithium secondary cell array to be specified should be of a high current design, whereby a coupling of several cells is to be realised via a corresponding series circuit. At the same time, there should be a possibility of intensively cooling the corresponding cells by simple means so that charging process can be shortened.

The object of the invention is solved by the combination of features in accordance with the teaching of patent claim 1, whereby the sub-claims comprise at least practical and advantageous further embodiments.

Accordingly, a lithium secondary cell array in a cylindrical design with a winding mandrel and a winding packet is assumed, whereby the winding packet comprises foil-like coated strips as well as contacting strips that form the electrical cell structure of anode, cathode and separator. Furthermore, there are also electrical connecting means which have pole caps.

According to the invention, the winding mandrel comprises an insulating material, in particular a ceramic material, whereby the winding mandrel has a through-channel extending in the longitudinal direction, designed for example as a through-bore.

The winding mandrel is connected to an inner pole cap at each end; the pole caps likewise have a through-channel.

In addition one outer pole cap with a through-passage is provided in each case which surrounds the winding packet circumferentially at least in the edge region. This outer pole cap is designed in the sense of a clamping ring or a clamping collar.

One or several radially arranged force-fit connecting means, each acting between the outer and inner pole cap, fix the winding packet and achieve the electrical contacting between the contacting strips and the outer pole cap.

A cell cooling liquid can be easily fed to the lithium secondary cell array via the quasi mechanical series connection of the through-channel and through-passage. Heat generated by the winding core can thus be dissipated to achieve effective cooling.

The overall arrangement is surrounded by a tube-like, insulating outer housing which, in one embodiment, holds a valve arrangement to renew electrolyte fluid and/or feed corresponding fluid.

In a preferred embodiment the winding mandrel is designed as a hollow cylinder, in particular a ceramic hollow cylinder, whose ends hold a section of the respective inner pole caps. The inner pole caps can hereby comprise a diameter-reduced area that is matched to the inner diameter of the hollow cylinder to effect a fastening of the inner pole caps, e.g. through an adhesive bond, in particular gluing.

The force-fit connecting means can be designed as screws or bolts that penetrate the winding at appropriate recesses in a radial direction, whereby the inner ends of the screws or bolts are held by a respective threaded bore in the corresponding inner pole cap.

In one alternative a clamping ring acts as a force-fit connecting means that is slid over the outer pole cap. The clamping ring can be fixed by a locking device, in particular a circlip. In the case of the embodiment of the force-fit connecting means as a clamping ring, the outer pole cap has a slightly conical design in the area of its chuck-like bulge. Holes for countersunk screws in the first variant of radially arranged force-fit connecting means in the outer pole cap and in the winding as well as corresponding threaded holes in the inner pole cap are not needed. The pressure exerted by the clamping ring ensures adequate contacting and a negligible internal resistance.

From the foregoing it follows that the inner pole cap forms at least part of the winding core and bears ends of the winding packet on the edge section side.

The outer pole caps display an internal thread in the area of their through-passage to receive a hollow cylindrical connecting piece for a series array of cells or to fix an electrical terminal or interim tap.

In a further embodiment of the invention, the winding packet consists of a copper and an aluminium foil strip, whereby these foil strips are provided with a layer of lithium and conductive particles, e.g. carbon black, leaving an edge area free in the longitudinal direction.

In the free edge area there are breaches or holes that lie above each other in the wound state of the respective strip. In addition, non-woven layers are inserted between the foil strips to carry the electrolyte and form conductive insert strips that are located in the free edge area within the winding. The insert strips also have breaches or holes whose position is congruent to the breaches or holes in the foil strips.

The aforementioned measures results in a large-scale contacting of the foil strip with the aid of the conductive insert strips using the force-fit connecting means.

Slot-shaped recesses in the edge area of the foils strip and the conductive insert strips mean that it is possible to supply electrolyte fluid or recirculated electrolyte, whereby the slot-shaped recesses are designed such that these also lie on top of each other in the finished winding.

A simplification of the winding design in the manner according to the invention can be realised as explained in the following. As explained above, the winding consists of six different components, namely a coated copper foil, a coated aluminium foil, one insert strip of each metal and two non-woven layers. The insert strips, whose job is to fill the spaces between the individual layers of the respectively coated metal foils and thus guarantee the transmission of electricity to the outside with a low electrical resistance, are not needed if the aforementioned metal foils have a gradation in this regard, in particular a step-like rolling. The height of the step is dimensioned in such a way that the original space, resulting from the thickness or height of the complementary metal foils and the non-woven layers between these, is filled. This allows the desired transmission of electricity to the outside to be realised in the desired manner and the composite winding consists of only four different components.

Summing up at this point, the invention represents an improved design of wound lithium cells, whereby the pole caps according to the invention presented here are a great improvement over the prior art. The cells designed in this way are particularly capable of high current, whereby the coupling of several cells is possible via a simple connector arrangement, which itself does not take up any great additional volume. Similarly, a heating of the individual and cooling of the series-connected cells is also possible by simple means via a non-conductive fluid through the pole caps. Using an aqueous electrolyte means that it can be replaced without having to dismantle the cells, thus prolonging their useful life. At the end of their operational service life the cells can be easily dismantled to allow an uncomplicated recycling of the respective raw materials.

According to the invention, a special fuse element is also provided for the series connection of the presented lithium secondary cell array. The high energy density of lithium secondary cells predestines these for an application in the field of electromobility. In order to achieve the corresponding necessary voltages, a number of lithium secondary cells are connected in series. In the event of the application of a strong mechanical force, as can occur in an accident with a vehicle, short-circuits can occur irrespective of the type of battery used that lead to an uncontrolled release of the energy stored in the cells. Through the series connection of the cells, at least several of the cells are affected by the unwanted and uncontrolled discharge. With the fuse element explained in the following, the uncontrolled discharge in the event of a short-circuit may be able to be limited to only one cell and, in the optimum case, prevented completely.

The fuse element according to the invention is based on the design of the cells as explained above. The cells hereby have connecting terminals with an outer thread that are led out axially and which optionally have a central, axial feedthrough to cool the core. There is a special problem with lithium cells in that with a series connection of successive cells, a transition between a cooper and an aluminium electrode has to be made. A direct contacting of these metals can cause mildly electrolytic effects in the event of moisture penetration, which in turn lead to a destruction of the contacts. The fuse element explained here also prevents this problem.

The fuse element presented here comprises two metallic discs, namely one copper and one aluminium disk, whose size and dimensions have been adapted to the cells that are to be connected.

Both disks have a feedthrough with an internal thread, preferably in the middle, which corresponds to the axial connecting terminals with external threads of the cells to be connected.

Both disks are concentrically opposite, i.e. with flush feedthroughs, and are mechanically connected with the aid of an electrically non-conductive, elastic material. The elastic disk used in this connection also has a central feedthrough to allow the aforementioned core cooling of the connected cells. The outer diameter of the elastic disk is smaller than the diameter of the aforementioned metallic disks.

In the free area of the metallic disks, i.e. the area outside the elastic disk, there are a number of feedthroughs around the circumference, each of which is also concentric, i.e. flush with each other. Locking pins are inserted into the flush feedthroughs according to the invention and fixed in place. The locking pins consist of a composite material made up of a copper section and an aluminium section. The corresponding composite materials are fixed to each other. The diameter of the locking pins is dimensioned in such a way that they can be inserted into and pushed through the aforementioned feedthroughs.

The locking pins may have a constriction in the middle to form a current constriction so as to achieve the desired release characteristics and to provide the necessary arcing.

The release current of a locking pin can be determined by the current constriction. In addition, the release current of the entire fuse element can be varied by the number of locking pins used. The number of feedthroughs in the disks can also be adapted accordingly to the respective intended purpose. It is thus possible to provide locking pins with specific, graduated release currents, the combination of which then results in the desired overall release current.

The fuse element according to the invention accordingly enables a non-corrosive connection of the axial connecting terminals of two lithium cells connected in series. The release current can be adjusted very finely by the number of locking pins used and by the choice of individual locking pins. This continues to guarantee a constant core cooling of the connected lithium cells. The size and shape of the fuse element can be individually adapted to the cells to be connected. A hexagonal shape, for example, can simplify assembly. A triggered fuse element can be reused by inserting new locking pins. If the diameter of the disks chosen is larger than the diameter of the cells to be connected, the locking pins can be exchanged without having to dismantle the fuse element. The direct installation of the fuse element directly between the cells to be connected does way with the considerable amount of wiring work that is needed on account of the wire cross-sections compared to external fuses. This also leads to fewer contact parts that could cause unnecessary contact resistances. Furthermore, little space is needed. In this way it is possible to fuse individual cells within a continuous array.

The invention will be explained in more detail in the following on the basis of one embodiment and with the aid of figures.

These show.

BRIEF DESCRIPTION OF THE SEVERAL VIEWS OF THE DRAWINGS(S)

DETAILED DESCRIPTION OF THE INVENTION

Figure 1:
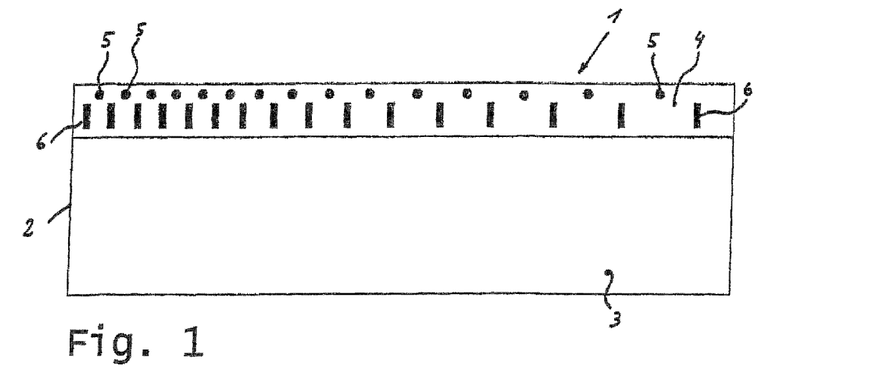
FIG. 1 a schematic diagram of a foil-like, partially coated strip for the later design of the winding packet.

The winding packet of the lithium secondary cell array consists of copper and aluminium foils strips designed as shown in FIG. 1. Only the lower part 2 of the foil 1 is hereby coated on both sides with lithium and carbon black 3. An edge strip in the longitudinal direction 4 remains uncoated. In the free edge area there is a row of holes 5 and a row of slot-shaped breaches 6.

The holes and slots can be made by punching, whereby this punching process takes place before the coating of the lower part, simplifying the technological handling.

The gaps between the holes 5 and slots 6 is chosen such that in the finished foil winding, for example, six radial through holes and the same number of offset slots are produced.

Since the diameter of the winding increases with every layer, the gaps between the holes 5 and slots 6 increase from the inside to the outside (from left to right in FIG. 1). The gap to be observed can be easily dimensioned and technologically realised on the basis of the respective foil thickness.

Figure 2:
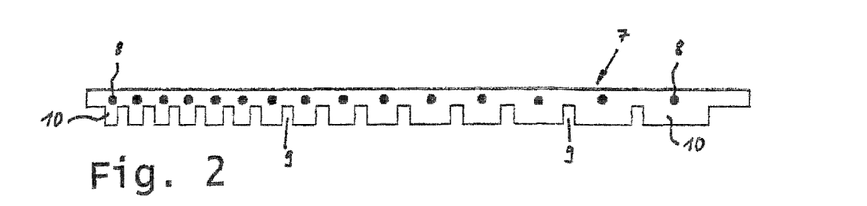
FIG. 2 a schematic diagram of the conductive insert strips.

The winding packet also comprises insert strips 7, as shown in FIG. 2. The insert strips are made of a conductive material and also have a row of holes 8. The insert strips 7 fill the space between two layers of each coated foil, whereby attention must be paid to the corresponding material thickness.

The holes 8 in the insert strips 7 are aligned with the corresponding holes in the foil. Instead of the slots 6 in the foils, the insert strips 7 have recesses 9 that are aligned with the slots 6 in the winding. The tongues 10 of the insert strips 7 that are produced by the recesses, and which point downwards in FIG. 2, fill the space between the slots in neighbouring layers of foil and form a spacer, as it were.

The design of the foil winding will be explained on the basis of FIG. 3.

The winding has a core, preferably designed as a tube 11 (see FIG. 4) made from a ceramic material, whose end holds the inner pole caps 12. The inner pole caps can be connected to the winding tube 11 through an adhesive bond, in particular through gluing 13 (see FIG. 4).

Figure 3:
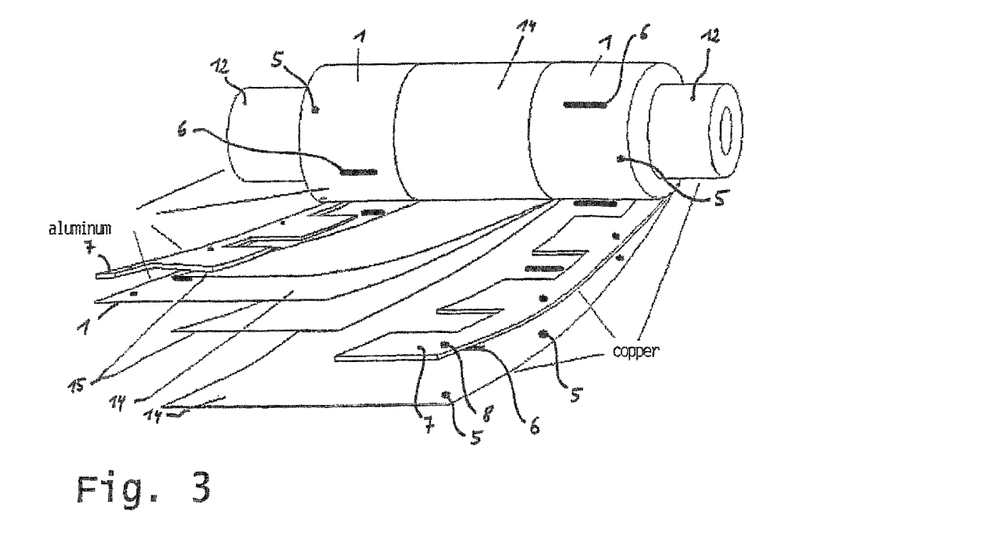
FIG. 3 a perspective view of the winding arrangement.

The foils 14 are placed on top of each other, as shown in FIG. 3, so that the edge strips are on different sides. The coated areas 3 lies on top of each other and are separated by a non-woven layer 15 between them. A further non-woven layer is then placed on top of the upper foil. This results in the recurrent sequence of a copper foil, non-woven, aluminium foil, non-woven, copper foil, non-woven, aluminium foil, non-woven, and so on, in the winding.

The insert strips 7 are arranged on both sides, whereby the thickness of the insert strip corresponds to the overall thickness of the coated aluminium foil and/or the coated copper foil and the corresponding non-woven layers. The corresponding holes 5 and slots 6 lie on top of each other in the overall arrangement; this also applies for the holes 8 of the insert strips 7. FIG. 3 also shows material data with respect to the conductive components to form the anode and cathode of the cell.

Figure 4:
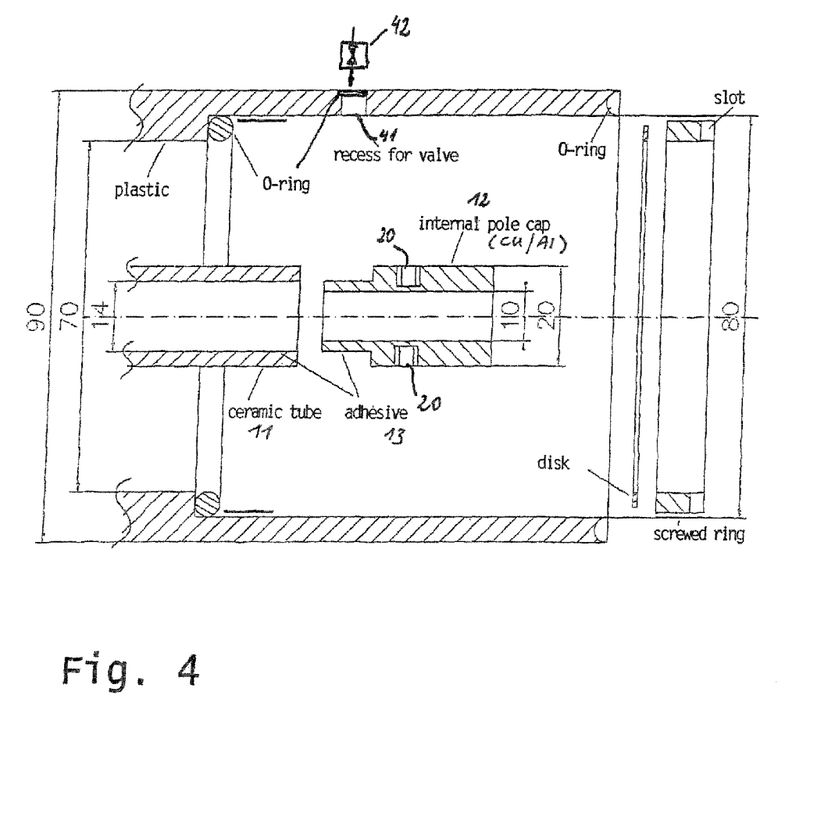
FIG. 4 a partial sectional view of an end side section of the cell arrangement with winding mandrel or winding core and inner pole cap not yet inserted into the winding core.
Figure 5:
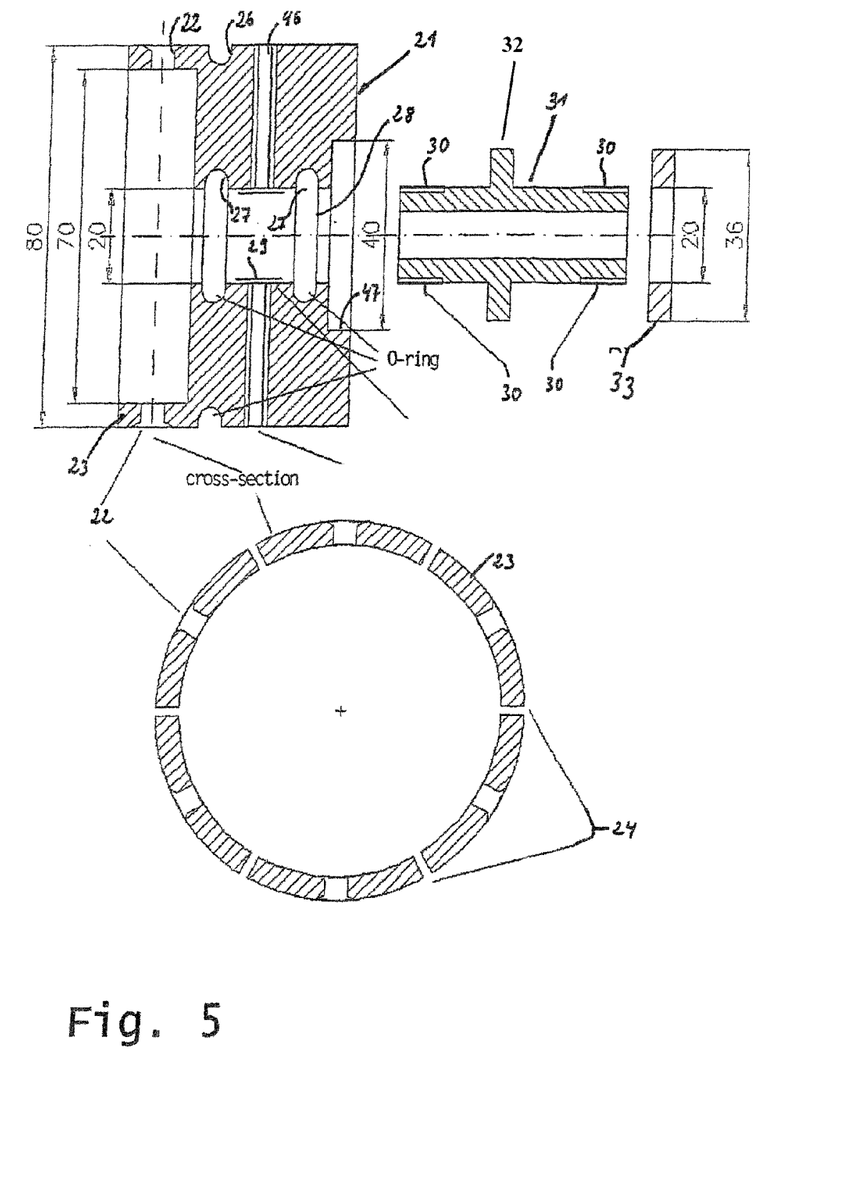
FIG. 5 a sectional view of the outer pole cap as well as a connector not yet inserted into a corresponding recess of the outer pole cap as well as a cross-sectional view of the end of the outer pole cap that points towards the winding packet, designed as a clamping head or clamping ring in accordance with the first embodiment.
Figure 6:
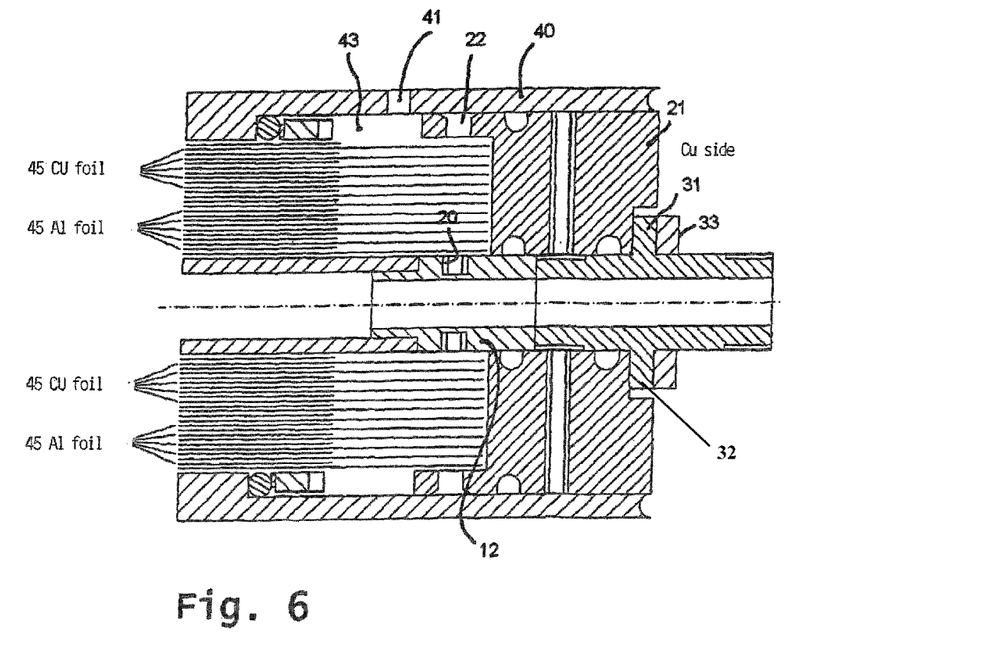
FIG. 6 a sectional view of the copper-side end of the lithium secondary cell array with clearly visible inner and outer pole caps as well as connector, whereby the screws to form the force-fit connection that fixes and contacts the winding packet have not yet been inserted.

The contacting of the respective sides of the winding is carried out with the aid of special pole caps, as shown in FIGS. 4, 5 and 6.

The inner pole cap 12 is hereby connected to a corresponding end of a ceramic tube 11 via a tapered section, preferably through an adhesive bond 13. The inner pole cap hereby forms part of the winding. In addition, the inner pole cap 12 has radial bore holes 20. These bore holes 20 have an internal thread. The holes 5 and 8 of the foils and the insert strips are in line with the bore holes and holes 20 in the inner pole cap 12.

Outer pole caps 21, made either of copper or aluminium, are then pushed onto the finished winding on both sides. Screws can be inserted through radial bore holes 22 in the outer pole caps 21 as force-fit connecting means that pass through the winding and extend into the bore holes 20 of the inner pole cap 12. A collar-like extension 23 of the outer pole cap 21 encompasses a lateral end of the winding (see FIG. 6) and fixes this with the aid of the screws inserted into the bore holes 22 as a force-fit connecting means.

Since the outer pole cap has a longitudinal slot in the section 23, this acts as a clamping ring or chuck. On account of the fact that the space between the individual layers of foil in the winding is filled by the aforementioned insert strips, this force-fit connection of the foil is effected without any major mechanical load. At the same time, the maximum possible contact surface of the wound foil is used and electrically connected to a large cross-section of the outer pole cap by the insert strips. The chuck-like slots are identified in FIG. 5 with the reference number 24. A circumferential groove 26 in the outer pole cap 21 holds a sealing ring. The groove 27 in an inner passage area 28 of the outer pole cap 21 serves the same purpose.

In the passage area 28 there is also an internal thread 29 that is complementary to an outer thread 30 of a connecting piece 31. The connecting piece 31 is electrically conductive and made, for example, of a stainless steel material such as V2A.

The connecting piece 31 may also have a collar 32, which forms a stop for a distance ring 33. In the embodiment in accordance with FIG. 5 the connecting piece 31 has external thread sections 30 on both sides. This allows a geometrical series connection of several lithium secondary cell arrays to guide a gaseous or liquid cooling medium via the longitudinal channel formed by this.

Figure 7:
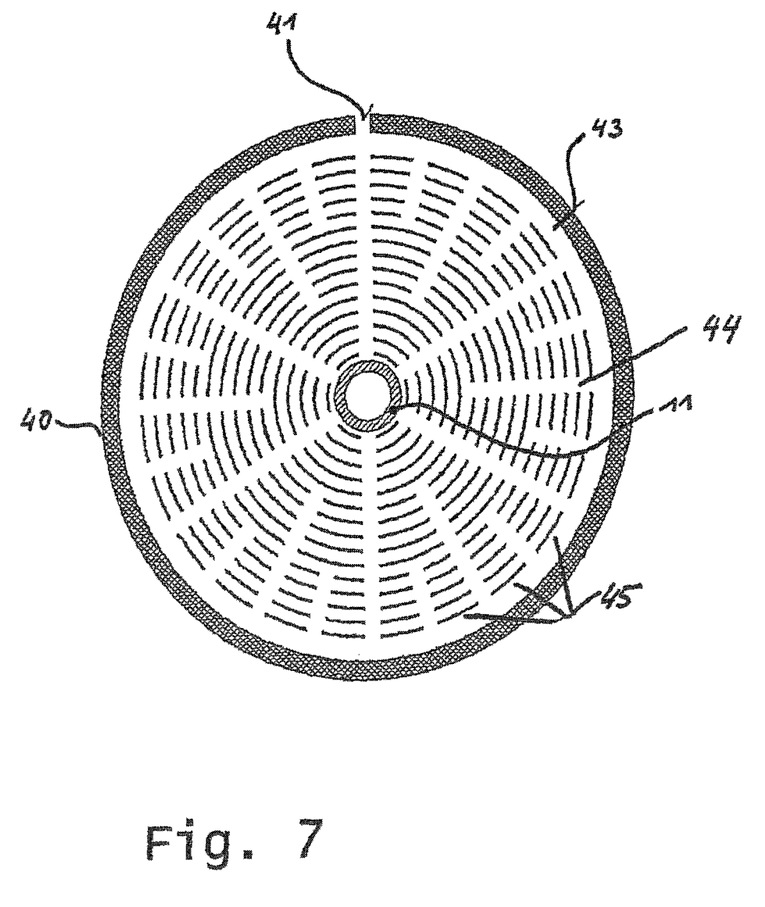
FIG. 7 a cross-section through the foil winding with plastic tube outer housing, recess for an electrolyte valve and visible, slot-shaped areas for the even penetration and effective insertion of a liquid electrolyte in the winding and thus in the cell array.

The outer housing of the overall arrangement, as can be seen in FIGS. 6 and 7, consists of a plastic tube 40 in a corresponding hollow cylindrical design. Corresponding sealing rings that are secured by washers and threaded ring, seal the end areas of the tube-shaped outer housing 40 to prevent a hydraulic short-circuit when exchanging an aqueous electrolyte. In the area of the existing slots in the wound foil the outer housing 40 has a recess 41 for a valve 42. The valve 42 can serve as protection against any excess pressure that may form or it may allow the filling or exchange of any aqueous electrolyte that is used. The valves are screwed into the housing 40 from the outside and are sealed by a sealing ring. There is a circumferential free space directly beneath the recess 41 (see also FIGS. 6 and 7). This circumferential free space 43 is used to distribute the electrolyte evenly over all slots 44 of the foil winding 45 (see in particular FIG. 7).

The outer pole cap 21 shown in FIG. 5 is used to clamp and contact the corresponding foil winding 45. The outer pole cap 21 is sealed off from the surrounding plastic tube by a sealing ring (see FIG. 6).

The visible axial feedthrough allows not only the passage of coolant but also a screw connection with the connecting piece 31.

Further O-rings within the feedthrough form seals against the inner pole cap 12 and the connecting piece 31. Supplemental radial threaded holes 46 in the outer pole cap 21 are used to hold grub screws that fix the thread of the connecting piece 31 on the inside and prevent any twisting against the outer housing 40 and the corresponding plastic tube. In this case the length of the screws is dimensioned so that these slightly protrude beyond the outer pole cap 21. There are holes in the outer housing 40 through which the aforementioned screws can be inserted and which are sealed after assembly by a sealing compound.

The connecting piece 31 as shown here consists of a stainless steel material, for example. The circumferential collar 32 of the connecting piece 31 fits into a recess 47 of the outer pole cap 21 to produce a flush surface. A large-scale contacting can optionally be effected here or the connecting piece 31 is bolted to the outer pole cap of a further cell via the mounted distance ring 33 so that the mentioned series connection can be realised. A corresponding O-ring permits sealing of the then opposite plastic tubes in the series connection. The conductive connecting piece 31 can be used to both connect cells as well as an end section in a series connection of cells.

FIG. 6 shows the result of the assembled cells in a sectional view. This shows the view from the copper side of the cell.

The cell is produced by first making a copper and an aluminium strip of the desired length and width and providing these with the necessary holes and slots. The strips can then be coated accordingly. Matching non-woven pieces and insert strips are also provided.

The ceramic tube as the winding core is stuck to the two inner pole caps. The inner and outer pole caps can be manufactured as simple turned parts.

The coated metal foils are wound around the tube together with the non-woven layers and insert strips so that the holes and bore holes on both sides are congruent. The winding produced in this way is then pushed into the outer housing.

O-rings are arranged around the winding as sealing rings; the corresponding washers put in place and threaded rings screwed into place.

Grooves or slots in the threaded ring may be used an aid to assembly in this case.

The necessary valves are then inserted into the outer housing and/or plastic tube and the outer pole caps pushed into place. Countersunk screws can be inserted through the corresponding holes into the inner pole caps and screwed to these. The connecting pieces are then arranged and fixed in place. If an electrolyte has to be provided in an aqueous form this can be filled in through the valves provided.

The described foils, which absorb electrical energy, receive this from only one side and only release this electrical energy on the same side. The length of the sides around which the foils are wound is typically around a meter to produce a high overall cross-section with even thin foils. What is decisive in the construction presented here is the complete utilisation of the maximum available cross-section for the transmission of current. The foils are contacted along the entire side through the insert strips without any significant mechanical load on the sensitive, thin material of the foils.

Contacting problems experienced in the prior art are ruled out. The tongues of the insert strips reach to shortly in front of the coated area of the foil strips, thus reducing the internal resistance of the foil strips.

The connection to the outer pole cap is made around the entire circumference of the foil winding with the width of the insert strip and is thus also over a large area. The outer pole caps with the screwed-in connecting pieces have a very large, flat contact surface on which a transfer to an external conductor of any diameter is possible. Very high currents can therefore flow without the occurrence of any losses or unwanted heating in the connecting area.

An advantage on the cooling side is that the cells have an axial feedthrough, starting with the connecting piece via the outer and inner pole caps through to the ceramic tube. The feedthrough is completely sealed off from the inside of the cell by corresponding sealing rings. This means that both non-conductive as well as any other coolant can be fed into the cell and cools this from the inside, a particular advantage during high-voltage charging since a large amount of thermal energy is produced inside the cell in this case.

If several cells are connected in series to form a continuous unit, as explained, the special design means that the axial feedthrough for the coolant is also continuous. This means that the effort required is no more than that needed to cool individual cells.

The electrolyte is the most heavily stressed component in a lithium cell. If aqueous electrolytes are used, the cell's service life can be prolonged by exchanging these. The cell construction presented here permits a very simple exchange of the electrolyte. Thanks to the valves mentioned in the plastic tube, the circumferential free space between the non-woven layers and the tongues of the insert strips in this as well as the slots in the foils, externally fed electrolyte can reach the entire cross-section of the winding and supply every part of the non-woven material there. The existing electrolyte is sucked off accordingly on the opposite side. The seal between the foil winding and plastic tube prevents the electrolyte from flowing past the winding so that no hydraulic short-circuit can occur.

The temperature of cells with a higher output, such as are needed for large storage batteries, can also be maintained as required by constant electrolyte circulation. In this case, such a circulation can also be combined with the aforementioned cooling procedure through the axial feedthrough.

The transfer of the electrolyte during operation places special demands on the surrounding technology. All components outside the cell that are involved in the circulation must be manufactured of insulating materials.

If high storage capacities are to be achieved, the width of the winding, though also the winding diameter can be increased. Corresponding scaling is therefore possible.

Since cooling with coolant through the axial feedthrough becomes less efficient with an increasing diameter it is particularly advantageous to supplement the cooling by electrolyte circulation since this cooling penetrates the entire winding. In order to achieve an as even a penetration as possible, further slots in accordance with FIG. 7 can also be provided in addition to the slots described, which lead from the outside to the centre, whereby the new slots only extend part of the way from the outside to the centre. FIG. 7 shows in a diagram how further slots 44 are to be arranged with an increasing diameter of the winding so as to guarantee an even penetration of the winding with electrolyte. Starting from the valve recesses 41, the electrolyte enters the circumferential free space 43, which has a relatively large cross-section with a low flow resistance. From here, the electrolyte passes through the slots in all layers of the winding and only has to cover short distances between the individual layers on account of the arrangement of the slots. Therefore, the path of the electrolyte through the areas with a small cross-section is practically only determined by the width of the winding.

The connecting pieces 31 allow the direct series connection of several cells so that the overall voltage can be increased. This produces an elongated cylinder with the diameter of a single cell but many times its length. In order to increase the capacity with the same voltage, the cells can also be connected in parallel. This can be effected with a simple component, for which a conductive strip is used comprising corresponding recesses for connecting pieces of adjacent cells. The thickness of the strip can be chosen accordingly. This kind of strip can also be used for the series connection of two cells. For example, an arrangement of a total of four cells, two each in parallel and two in series, can be connected by this kind of strip, resulting in double the capacity and a correspondingly higher voltage compared to a single cell.

Interim taps can also be realised in a similar manner. Cable lugs can be inserted between the cells in a series connection in a manner similar to that described above. A strip with a corresponding hole-like recess can also be inserted that is bent at an angle outside the cell so that insulation can be run parallel to the cylinder of the screwed cells to one of the ends of the cylinder. Several taps can be arranged at random around the cylinder with such strips or they can be bent at an angle with an increasing distance. In both cases one receives all connections bundled at one of the ends of the cells connected in series with little effort. These taps can also be used analogously for cells switched in parallel.

The cell according to the invention can be manufactured in the manner described above with no special technological steps. There is no welding or any other inseparable connection. A cell assembled in this way can therefore be dismantled just as easily. This results in significant advantages during recycling.

Figure 8:
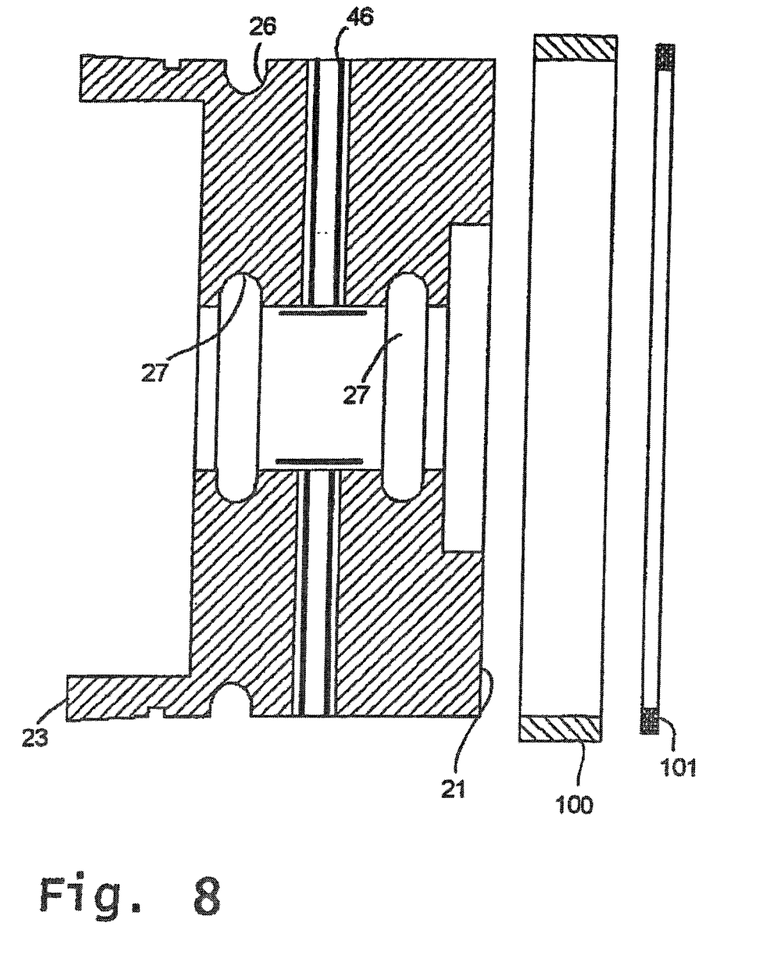
FIG. 8 a sectional view of the outer pole cap in accordance with a second embodiment of the invention with a conical design in the area of the chuck-like bulge and a clamping ring as a force-fit connecting means, and FIG. 9 a perspective view of the fuse element according to the invention for the series connection of several axial lithium secondary cells.

In accordance with illustration in FIG. 8, a further simplification can be achieved when fastening the outer pole cap.

Reference is made to the explanations for FIG. 5 with respect to the reference numbers in accordance with FIG. 8. The fastening of the outer pole caps to the winding, whose inside contains ceramic tube with the inner pole caps, can also be realised with a clamping ring 100 in accordance with FIG. 8 instead of the possibility of a fixation by means of countersunk screws using the bore holes 22 (see FIG. 5).

For this purpose, the outer pole cap has a slightly conical design in the area of the chuck-like bulge 23. The clamping ring 100, e.g. made of V4A steel, is then placed over the outer pole cap and secured by a circlip 101, e.g. of bronze, that catches in the corresponding recess of the outer pole cap.

This measure also simplifies the production of the foils and an insert strip, if this is used, since the holes that would otherwise have to be made there are no longer needed.

The fuse element for the series connection of several lithium secondary cells according to the invention will be explained in more detail with the help of FIG. 9.

Figure 9:
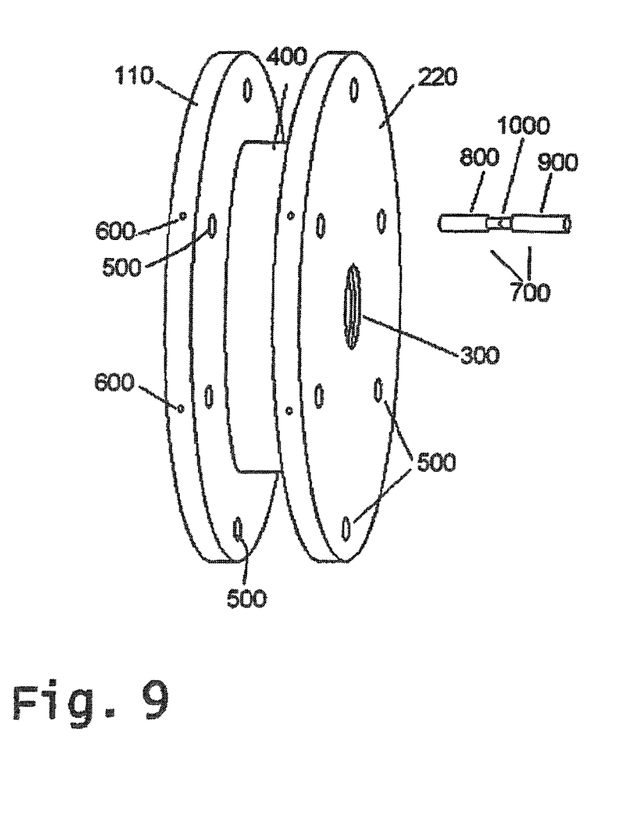

The fuse element in accordance with the embodiment pursuant to FIG. 9 has a copper disk 110 and an aluminium disk 220, whose size and shape are adapted to the cells to be connected.

There is a feedthrough 300 with an internal thread in the middle between the disks 110 and 220 that corresponds with the axial connecting terminals and the external threads there of the cells to be connected.

Both disks 110 and 220 are opposite each other with a flush feedthrough and are mechanically connected by means of an electrically non-conductive disk, in particular a rubber disk 400.

The rubber disk 400 also has a central feedthrough to enable a continuous core cooling of the connected cells.

The rubber disk has a smaller diameter on the outside than the disks 110 and 220.

In the circumferential area of the disks 110 and 220, which is outside the rubber disk 400, there are a number of feedthroughs 500, each of which is flush between the two disks 110 and 220. Locking pins 700 are inserted into these flush feedthroughs 500 and fixed in place, e.g. with grub screws, in the threaded holes 600, that reach radially from the outside edges of the disks 110 and 220 through to the feedthroughs 500.

The locking pins 700 comprise a composite element consisting of a copper section 800 and an aluminium section 900. The corresponding materials are inseparably joined by a procedure known to a person skilled in the art.

The diameter of the locking pins 700 is dimensioned in such a way that they can be easily inserted into and pushed through the feedthroughs 500. In a preferential embodiment, the locking pins 700 can have a taper 1000 in the middle to achieve the desired release characteristics.

The disks 110 and 220 are screwed to the respective axial connecting terminals of the cells to be connected so that the disk 110 of cooper is connected to the copper terminal of one and the aluminium disk 220 with the aluminium terminal of the other cell.

The cells are mechanically stable, but also have an elastic contact, through the rubber disk 400 between them that is firmly joined to the disks.

The electrical connection between the cells is produced solely by the locking pins 700 to be inserted. Since the contact between the metals copper and aluminium is only made via this firm connection within the locking pins 700, no moisture can penetrate so that any kind of corrosion is, in principle, ruled out.

The release current for a respective locking pin 700 can be easily determined by the relevant taper 1000. Furthermore, the release current for the entire fuse element 700 can be varied in steps by the number of fuse elements 700 inserted. The number of feedthroughs 500 can be adapted accordingly to the corresponding intended purpose and the current flow.

What is claimed is:

1. Lithium secondary cell array in a cylindrical design, comprising a winding mandrel and a winding packet, which contains foil-like coated strips and conductive strips that form the electric cell structure of anode and cathode and separated by a separator, and with outer electrical connecting means comprising pole caps, characterised in that
the winding mandrel comprises an insulating material and has a through-channel extending in the longitudinal direction, the winding mandrel is connected to an inner pole cap at each end, the inner pole caps likewise have a through-channel, furthermore respective outer pole caps, each outer pole cap has a through-passage which surrounds and contacts the winding packet circumferentially at least in the edge region, whereby several radially arranged force-fit connections, each acting between the outer and inner pole cap, fix the winding packet and achieve the electrical contacting between the conductive strips and the outer pole cap, whereby the winding packet consists of a copper and an aluminium foil strip, whereby the foil strips are provided with a layer of lithium and conductive particles leaving an edge area free in the longitudinal direction, whereby breaches or holes are provided in the free edge area, each of the breaches or holes being separated by a gap, wherein the gaps increase from the inside to the outside of the winding packet so that the breaches or holes lie above each other in the wound state of the respective strip, in addition, non-woven layers are inserted between the foil strips to carry the electrolyte and conductive insert strips are formed as conductive strips that are located in the free edge area within the winding, whereby the insert strips also have breaches or holes whose position is congruent to the breaches or holes in the foil strips.

2. Lithium secondary cell array in accordance with claim 1,
characterised in that
a cell coolant can be fed via the mechanical series connection of the through-channels and through-passages.

3. Lithium secondary cell array in accordance with claim 1,
characterised in that
the lithium secondary cell array is surrounded by a tube-like, insulating outer housing.

4. Lithium secondary cell array in accordance with claim 1,
characterised in that
the winding mandrel is designed as a hollow cylinder whose ends hold a section of the respective inner pole cap.

5. Lithium secondary cell array in accordance with claim 1,
characterised in that
the force-fit connecting means are designed as screws or bolts that penetrate the winding at appropriate recesses in a radial direction, whereby the inner ends of the screws or bolts are held by a respective threaded bore in the corresponding inner pole cap.

6. Lithium secondary cell array in accordance with claim 1,
characterised in that
the inner pole cap forms at least part of the winding core.

7. Lithium secondary cell array in accordance with claim 1,
characterised in that the outer pole caps display an internal thread in the area of their through-passage to receive a hollow cylindrical connecting piece for a series array of cells or to fix an electrical terminal or interim tap.

8. Lithium secondary cell array in accordance with claim 1,
characterised in that
a large-scale contacting of the foil strip is effected by means of the conductive insert strips.

9. Lithium secondary cell array in accordance with claim 1,
characterised in that
slot-shaped recesses in the edge area of the foil strips and the conductive insert strips mean that it is possible to supply electrolyte fluid or recirculated electrolyte, in particular to maintain the temperature, whereby the slot-shaped recesses are designed such that these lie on top of each other in the finished winding.

10. Lithium secondary cell array in accordance with claim 6,
wherein the winding core is in the form of a winding mandrel and
the inner pole cap forms at least part of the winding mandrel.

* * * * *